July 10, 1923.   1,461,230

E. STUBBS ET AL

SKEW HELICAL CROWN GEARING

Filed July 1, 1922

INVENTOR
Everard Stubbs
Edwin R. Fellows
by Wright, Brown, Quinby & May
Att'ys

Patented July 10, 1923.

1,461,230

UNITED STATES PATENT OFFICE

EVERARD STUBBS AND EDWIN R. FELLOWS, OF SPRINGFIELD, VERMONT, ASSIGNORS TO THE FELLOWS GEAR SHAPER COMPANY, OF SPRINGFIELD, VERMONT, A CORPORATION OF VERMONT.

SKEW HELICAL CROWN GEARING.

Application filed July 1, 1922. Serial No. 572,300.

*To all whom it may concern:*

Be it known that we, EVERARD STUBBS and EDWIN R. FELLOWS, citizens of the United States, residing at Springfield, in the county of Windsor and State of Vermont, have invented new and useful Improvements in Skew Helical Crown Gearings, of which the following is a specification.

The present invention relates to gearing; and its general object, broadly and comprehensively stated, is to furnish toothed gearing, the principles of which, in various embodiments, may be applied to purposes and uses for which hitherto positive gearing has been practically unsuitable.

There are many situations in which driving by gears would be highly desirable, but has not been practically feasible because the gear forms heretofore known either have not permitted of the driven parts being held steadily enough when rotated at the required speeds, or have not permitted the required speed ratios in the available space, or have been excessively noisy or too expensive in cost of production for commercial use. For illustration of one such situation, we may mention spinning machines of the ring spinning type for producing finished yarn, in which a large number of duplicate spindles have to be rotated at excessively high speed from a common power shaft. The manner in which such spindles must be mounted to prevent objectionable vibration precludes arranging the power shaft in the same plane with the spindles which it drives, while no gear forms have been known which would permit of a positive gear drive from the shaft to the spindles in the direction and at the speed required in the necessary limitations of space without intolerable noise and vibration. Hence the spindles of such machines have always been driven in commercial practice by bands or tapes. In numerous other situations, more or less analogous to the particular illustration given, parts rotating on non-intersecting and non-parallel axes could with advantage have been positively geared together if it had been possible to provide suitable gearing, but other driving means have had to be used on account of the lack hitherto of suitable gears.

Such gear elements and couples as have been heretofore designed for transmitting power between non-intersecting shafts have either been so crude and inaccurate as to create intolerable vibration and noise when driven at high speeds, or have been of a type excessively expensive to make, and impossible to produce in the lower ratios of larger to smaller gear, or have compelled the shafts to be placed too far apart and have been unusable in situations where the shafts are required to be near together.

In view of the foregoing explanation, our object may now be more specifically stated as being to furnish a gear couple adapted to be made in various speed ratios, the members of which may be mounted to rotate about non-intersecting axes transverse to one another, but at the same time relatively near together at any ratio, and the teeth of which may be shaped by generating methods so as to mesh together with correct rolling action and proper bearing throughout a substantial length, and the commercial production of which may be carried out at minimum cost.

The invention consists, then, in a gear couple comprising a helical spur pinion and a crown gear conjugate to such pinion; and it consists further in the crown gear element of the couple as a new article of manufacture; such couple and crown gear having characteristics adapting them to accomplish the above stated objects, as will now be explained in detail with reference to the accompanying drawings.

In the drawings:—

Like reference characters indicate the same parts in all the figures.

Figure 1:
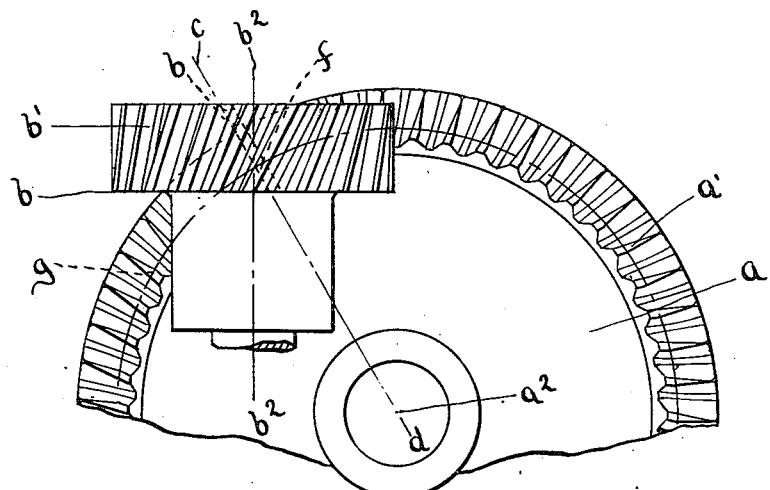
Figure 1 is a face view showing the spur pinion element, and a part of the crown gear element in mesh therewith, of a gear couple embodying the invention.
Figure 2:
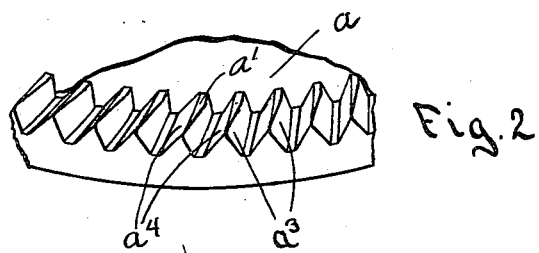
Figure 2 is a perspective view of a fragment of the crown gear.
Figure 3:
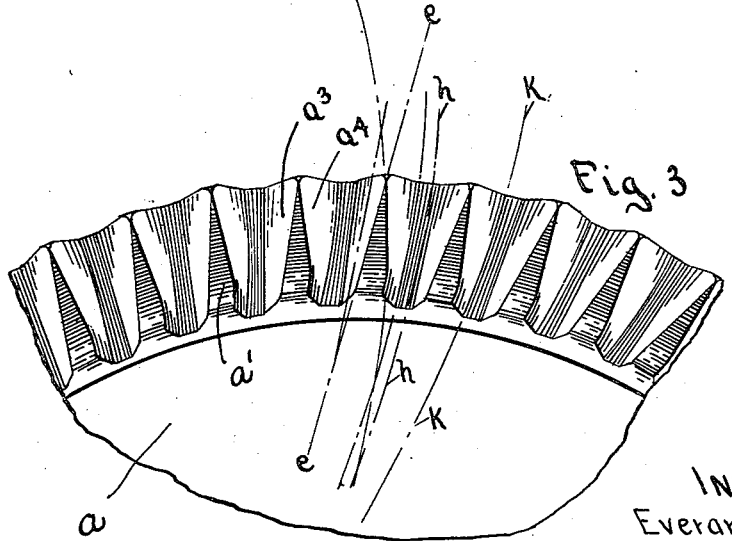
Figure 3 is a face view on a larger scale of a fragment of the crown gear.

The principles of construction and arrangement of our new gearing are shown illustratively in Figure 1, where $a$ represents a crown gear having teeth $a'$, and $b$ represents a spur pinion having helical teeth $b'$. The location of the gear axis is indicated at $a^2$ and the pinion axis by the line $b^2$—$b^2$. These axes, as is clearly shown by the drawing, are both non-parallel and non-intersecting, but each is perpendicular to a line parallel to the other. At the same time the axis of the pinion is relatively near the axis of the gear, being less distant from the latter axis than the circumference of the gear, that is, the tooth-bearing zone of the gear.

For convenience of descriptive definition we have called this gear a "skew helical crown gear." It is novel in the form and contours of its teeth, but its novel characteristics can best be defined with reference to the pinion and to the method of generation by which its tooth curves are formed. The pinion, also, although in principle of known character, is specially formed with reference to the relation which it holds to the gear, in that the helix angle of its teeth is established at such value that the acting face of each tooth, when in the middle of its arc of action, is approximately radial to the gear, within limits of variation presently set forth. This condition may be otherwise more exactly defined as follows. Assume that the line $c$—$d$ is radial to the gear and also perpendicular to the axle of the gear, and that it passes through the point indicated at $f$ where the linear speeds of the pinion and of the gear are equal and where their momentary directions of travel are most nearly the same; that is, where the divergence of their directions of travel is only that due to the skew arrangement of the pinion. This point may be called the common pitch point of the pinion and the gear. Now, with reference to the point and line thus defined, the helix angle of the pinion may be considered as such that the active faces of the pinion teeth when at the middle of their arc of action become approximately tangent, within limits, at the common pitch point $f$, to the radius $c$—$d$ of the gear which passes through this point. Obviously the absolute value of this angle, with respect to the axis of the pinion, depends on the distance that the pinion axis is offset from the axis of the gear.

The limits of possible variation of the pinion teeth, from the approximately radial relation to the gear, heretofore defined, are determined by the occurrence of interference between the pinion and the inner ends of the gear teeth, or rather by occurrence of need for undercutting the faces of the gear teeth at these ends in order to avoid interference. That is, the teeth of the gear must have correct face curves, conjugate to the teeth of the pinion at the distance of the common pitch point $f$ from the center of the gear. Assuming that the curved line $g$ represents a cylindrical surface coaxial with the gear axis $a^2$ and passing through the common pitch point $f$, then the pinion teeth must not be inclined either way from the radius $c$—$d$ so far as would require cutting away of the face curves of the gear teeth between the line $g$ and the center of the gear, to avoid interference. Wider limits of possible variation are found in the case of the larger ratios of gear to pinion than with the smaller ratios. Without intending to state any exact limits, but rather by way of illustration, we may say that when the ratio of the gear to the pinion is as large as four or five to one, the variation of the pinion tooth angle may be as much as fifteen or twenty degrees either way from the radial relation heretofore defined; while for ratios of two to one, or less, the limits of variation are much narrower. Such pinion may be generated and cut by known methods, for instance in the manner and by means substantially as disclosed for cutting helical gears in the patent of Edwin R. Fellows No. 676,227, dated June 11, 1901.

The preferred mode of forming correct tooth curves in the gear to mesh with the pinion so defined, is to generate such curves according to the principles disclosed in the beforementioned Patent No. 676,227, and in the later patent to Fellows No. 982,551 dated January 24, 1911. In applying these principles we preferably use a helical cutter such as shown in said Patent No. 676,227, having the same diameter and the same number of teeth, with the same pitch and helix angle, as the pinion; and we preferably mount the cutter for operation on a gear blank in a machine which is novel in this respect, that the axes of the spindles whereon the cutter and gear blank are mounted have the same relation to each other as the axes on which the pinion and crown gear are to be arranged, and in other respects is substantially like the gear generating machine disclosed in the aforesaid Fellows Patent No. 982,551. In then operating the machine so equipped, as explained in said patents, to cut teeth in a gear blank, the teeth $a'$ of the gear are generated with face curves which, in all planes of section transverse to the length of these teeth and outside of the line $g$, are conjugate with substantially mathematical accuracy to, and adapted to make correct rolling contact with, the parts of the pinion teeth which engage the gear teeth in the same planes of section.

While specific variations will be found between gears produced according to this invention to mesh with pinions of different amounts of offset, different helix angles, and (or) different ratios, certain superficial characteristics common to all species may be noted. Thus, although the teeth are more or less nearly radial to the gear, they are not exactly so, but are curved, as indicated by the lines $h$—$h$ and $k$—$k$, which coincide with the bottom elements of opposite sides of the same tooth. They are, also, unsymmetrical on opposite sides, the face $a^3$, which is turned toward the pinion when at the side of the radius $c$—$d$ away from the axis $b^2$—$b^2$, being flatter in curvature (as to its elements lying in planes perpendicular to the axis $a^2$) than the opposite face $a^4$.

The teeth of the gear so characterized are long enough to have ample strength and their face curves have the forms necessary for correct rolling action with, and uniform bearing on, the pinion teeth. Their accuracy of form and spacing enables the couple to turn at high speed without objectionable noise or vibration. The offset between the axes of the pinion and gear enables the couple to be used where gears which must turn about intersecting axes cannot be used, but as the amount of offset is less than the radius of the large gear, the invention permits of a high gear ratio being applied in a compact arrangement where the driving and driven shafts are relatively close together; and the fact that both sides of the teeth may be generated in one operation makes the cost of manufacture lower than that of gears of which the teeth must first all be cut on one side and then all cut on the opposite side.

In addition to all the foregoing, the couple has the further advantage that the pinion may be adjusted axially in either direction within wide limits, without affecting the character of mesh between the conjugate teeth. Apart from structural limitations of space imposed by circumstances having nothing to do with this invention, the only limits to such adjustments are those fixed by the width of face of the pinion.

What we claim and desire to secure by Letters Patent is:

1. A gear couple consisting of a crown gear and a helical spur pinion, the axis of the pinion being transverse to the axis of the gear and between the latter axis and the tooth-bearing zone of the gear, and the helix angle of the pinion teeth being such that the active face of each tooth becomes approximately radial to the gear when such face passes through the middle of its arc of action.

2. A skew helical crown gear having teeth formed throughout the greater part of their extent with mathematically correct face curves conjugate to the teeth of a helical spur pinion, of which the axis lies between the center and the circumference of the gear, and the teeth when in the middle of their arc of action are approximately radial to the gear.

3. A gear couple consisting of a helical spur pinion and a crown gear arranged with non-intersecting axes, but the axis of the pinion being within the circumference of the gear, the teeth of such gear being conjugate to those of the pinion.

4. A skew helical crown gear having teeth which are of relatively different contour on opposite faces and are conjugate to the teeth of a helical pinion whose axis is parallel to a line intersecting the axis of the gear and is within the circumference of the gear.

5. A skew helical crown gear having generated teeth, the face curves of which are mathematically conjugate to the teeth of a helical pinion, the axis of which is offset from the axis of the gear to a distance less than the circumference of the gear.

6. A gear couple consisting of a crown gear and a helical pinion arranged on non-parallel and non-intersecting axes, the helix angle of the pinion tooth being such that the active face of such tooth, when in the middle of its arc of action, approximately coincides with the radius of the gear through the common pitch point of the couple and the teeth of the gear being conjugate to the pinion tooth so characterized.

7. A skew helical crown gear having teeth which are substantially radial and in a plane perpendicular to the axis of the gear, but as a whole are longitudinally curved in such plane and are unsymmetrical on opposite sides.

8. A skew helical crown gear having teeth which are substantially radial and in a plane perpendicular to the axis of the gear, but as a whole are longitudinally curved in such plane and are unsymmetrical on opposite sides, one side having a flatter longitudinal curvature than the other.

9. A gear couple, consisting of a pinion and a crown gear arranged on non-parallel axes offset from one another by a distance less than the pitch radius of the gear; the pinion having spur helical teeth of which the helix angle is such that the faces of said teeth become approximately tangent at the common pitch point of the couple to the radius of the gear which passes through this point, and the gear having non-symmetrical teeth of which the face toward the pinion, when at the side of said radius away from the axis of the pinion, is of flatter longitudinal curvature than the opposite face.

10. A gear couple, consisting of a pinion and a crown gear arranged on non-parallel axes offset from one another by a distance less than the pitch radius of the gear; the pinion having spur helical teeth of which the helix angle is such that the faces of said teeth become approximately tangent at the common pitch point of the couple to the radius of the gear which passes through this point, and the gear having teeth of which the transverse sections, in planes outside of a line concentric with the gear and passing through said common pitch point, are conjugate to those parts of the pinion tooth faces which engage the gear teeth in the same planes of section.

In testimony whereof we have affixed our signatures.

EVERARD STUBBS.
E. R. FELLOWS.